United States Patent [19]

Smalley

[11] Patent Number: 5,300,203
[45] Date of Patent: Apr. 5, 1994

[54] PROCESS FOR MAKING FULLERENES BY THE LASER EVAPORATION OF CARBON

[75] Inventor: Richard E. Smalley, Houston, Tex.

[73] Assignee: William Marsh Rice University, Houston, Tex.

[21] Appl. No.: 799,404

[22] Filed: Nov. 27, 1991

[51] Int. Cl.$^5$ .............................................. C01B 31/00
[52] U.S. Cl. ............................ 204/157.41; 204/157.47; 423/445 B
[58] Field of Search ................ 423/445 B, 460, 445; 204/157.41, 157.47, 157.45, 157.46

[56] References Cited

U.S. PATENT DOCUMENTS 5,227,038 7/1993 Smalley ............................... 204/173

FOREIGN PATENT DOCUMENTS 9204279 3/1992 PCT Int'l Appl. .......... C01B 31/00
1587000 8/1990 U.S.S.R. .

OTHER PUBLICATIONS

Holczer et a l., "Alkali Fulleride Superconductors: Syntasesis Compositon, and Diamagnetic Shielding", *Science*, vol. 252, pp. 1154–1157 May 24, 1991.
Baum, "Flood of Fullerene Discoveries Continues Unabated", *C & EN* pp. 25–33, Jun. 1, 1992.
Bae et al. *Mat. Res. Soc. Symp. Proc.*, vol. 206, pp. 733–741 Nov. 29, 1990.
Lefevre, Annales Astrophysiq, "Etude De Poussieres De Fer Et De Carbone," Tome 30, Annee 1967, Fasc. 4, pp. 731–738.
J. Lefvre, "An Experimental Study of the Dust of Iron, Carbon, Silicon Carbide and Silica," Astron. & Astrophys, 5, (1970), pp. 37–44.
K. L. Day, D. R. Huffman, "Measured Extinction Efficiency of Graphite Smoke in the Region 1200–6000 Å," Nature Physical Science, vol. 243, May 21, 1973, pp. 50–51.
H. W. Kroto, J. R. Health, S. C. O'Brian, R. F. Curl & R. E. Smalley, "C$_{60}$: Buckminsterfullerene," Nature, vol. 318, No. 6042, Nov. 14–20, 1985.
J. R. Heath, S. C. O'Brien, Q. Zhang, Y. Liu, R. F. Curl, H. W. Kroto, F. K. Tittel, and R. E. Smalley, "Lanhanum Complexes of Spheroidal Carbon Shells," Journal of the American Chemical Society, vol. 107, (1985), pp. 7779–7780.
Q. L. Zhang, S. C. O'Brien, J. R. Health, Y. Liu, R. F. Curl, H. W. Kroto, and R. E. Smalley, "Reactivity of Large Carbon Clusters: Spheroidal Carbon Shells and Their Possible Relevance to the Formation and Morphology of Soot," The Journal of Physical Chemistry, vol. 90, No. 4, (1986), pp. 525–528.
Sumion Iijima, "The 60–Carbon Cluster Has Been Revealed," The Journal of Physical Chemistry, vol. 91, (1987), pp. 3466–3467.
Ph. Gerhardt, S. P. Loffler and K. H. Homann, "Polyhedral Carbon Ions in Hydrocarbon Flames," Chemical Physics Letters, vol. 137, No. 4, Jun. 19, 1987, pp. 306–310.
D. R. Huffman, "Methods of Difficulties in Laboratory Studies of Cosmic Dust Analogues," *Experiments On Cosmic Dust Analogues*, vol. 149, Sep. 8–12, 1987, pp. 25–41.
R. F. Curl and R. E. Smalley, "Probing C$_{60}$," Science, vol. 242, Nov. 18, 1988, pp. 1017–1022.
W. Kratschmer, K. Fostiropoulos, D. R. Huffman, "Search For The UV and IR Spectra of C$_{60}$ in Laboratory-Produced Carbon Dust," *Dusty Objects In the Universe*, Sep. 8–13, 1989, pp. 89–93.
W. Kratschmer, K. Fostiropoulos and D. R. Huffman,

(List continued on next page.)

*Primary Examiner*—Michael Lewis
*Assistant Examiner*—Stephen G. Kalinchak
*Attorney, Agent, or Firm*—Baker & Botts

[57] ABSTRACT

Fullerenes are generated by vaporizing carbon with a laser beam and maintaining the vaporized carbon at conditions selected to promote fullerene growth and formation. This method of fullerene generation may be used to form new compounds including fullerenes surrounding one or more metal atoms, and fullerenes wherein one or more carbon atoms have been substituted with boron or nitrogen.

2 Claims, 3 Drawing Sheets

OTHER PUBLICATIONS

"The Infrared and Ultraviolet Absorption Spectra of Laboratory-Produced Carbon Dust: Evidence for the Presence of the $C_{60}$ Molecule," Chemical Physics Letters, vol. 170, No. 2, 3, Jul, 6, 1990, pp. 167–170.

Ajie, et al., "Characterization of the Soluble All-Carbon Molecules $C_{60}$ and $C_{70}$," The Journal of Physical Chemistry, vol. 94, No. 24, (1990), pp. 8630–8633.

R. E. Haufler, J. Conceicao, L. P. F. Chibante, Y. Chai, N. E. Byrne, S. Flanagan, M. M. Haley, S. C. O'Brien, C. Pan, Z. Xiao, W. E. Billupe, M. A. Ciufolini, R. E. Hauge, J. L. Margrave, L. J. Wilson, R. F. Curl, and R. E. Smalley, "Efficient Production of $C_{60}$ (Buckminsterfullerene), $C_{60}H_{36}$ and the Solvated Buckide Ion," The Journal of Physical Chemistry, vol. 94, No. 24, (1990), pp. 8634–8636.

"Buckminsterfullerene Bulletin", Diamond Depositions: Science and Technology, Nov, 1990, pp. 11–13.

R. E. Haufler, Y. Chai, L. P. F. Chibante, J. Conceicao, Changming Jin, Lai-Sheng Wang, Shigeo Manyama and R. E. Smalley, "Carbon Arc Generation of $C_{60}$," Mat. Res. Sco. Symp. Proc. vol. 260, (1991), pp. 627–637.

Ting Guo, Changming Jin, and R. E. Smalley, "Doping Bucky: Formation and Properties of Boron-Doped Buckminsterfullerene," The Journal of Physical Chemistry, vol. 95, No. 13, (1991), pp. 4948–4950.

Yaw S. Obeng, Allen J. Bard, "Langmuir films of $C_{60}$ at the air-water interace", J. Am. Chem. Soc., vol. 113, No. 16 (1991).

"Move over silicon—it's time for a 'Bucky ball' chip," Chemical Engineering, vol. 98, No. 1, Jan. 1991, p. 17.

Yan Chai, Ting Guo, Changming Jin, Robert E. Haufler, L. P. Felipe Chibante, Jan Fure, Lihong Wang, J. Michael Alford, and Richard E. Smalley, "Fullernes with Metals Inside," The Journal of Physical Chemistry, vol. 95, No. 20, (1991), pp. 7564–7568.

"Carbon 60," Chemical Business, Mar., 1991, p. 33.

J. Thomas KcKinnon, William L. Bell, "Combustion synthesis of buckminsterfullerene," Mar. 17–19, 1991.

Christopher Munford, "New all-carbon hollow molecules under study," American Metal Market, vol. 99, May 1, 1991, p. 4(1).

Rob Lee, "Buckminsterfullerene: The Third Allotrope of Carbon," Chemistry and Industry, May 20, 1991, p. 349(2).

Andrew Moody, "Fullerene chemistry," Chemistry and Industry, May 20, 1991, p. 346(2).

Jim Baggett, "Great Balls of Carbon," New Scientist, Jul. 6, 1991, pp. 34–38.

Tsukasa Furukawa, "Japanese compete in buckyball Game: Vacuum Metallurgical enters fray," American Metal Market, Jul. 10, 1991, p. 4.

Tsukasa Furukawa, "New NEC material said to break superconductivity record," American Metal Market, Jul. 24, 1991, p. 4.

"New Molecule Excites the Suberconductivists," Computergram International, Aug. 6, 1991.

Robert F. Curl and Richard E. Smalley, "Fullerenes," Scientific American, Oct., 1991, pp. 54–63.

PROCESS FOR MAKING FULLERENES BY THE LASER EVAPORATION OF CARBON

This invention was made with Government support and the Government has certain rights in the invention.

BACKGROUND OF THE INVENTION

I. Field of the Invention

This invention relates to molecular forms of carbon known as fullerenes wherein the fullerene cage encloses one or more metal atoms and to the process for making the fullerenes. A fullerene is a third form of pure carbon and is different from graphite and diamond, the only two forms known before 1985, see "Fullerenes," Curl, R. F. and Smalley, R. E., Scientific American, October, 1991, pp. 54-63, incorporated herein by reference, and references cited therein.

Figure 1:
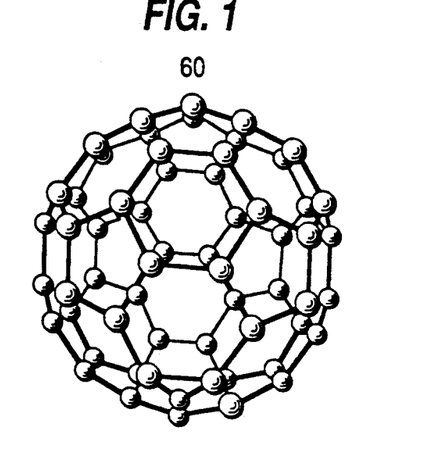
FIG. 1 is a diagram showing $C_{60}$, buckminsterfullerene.
Figure 2:
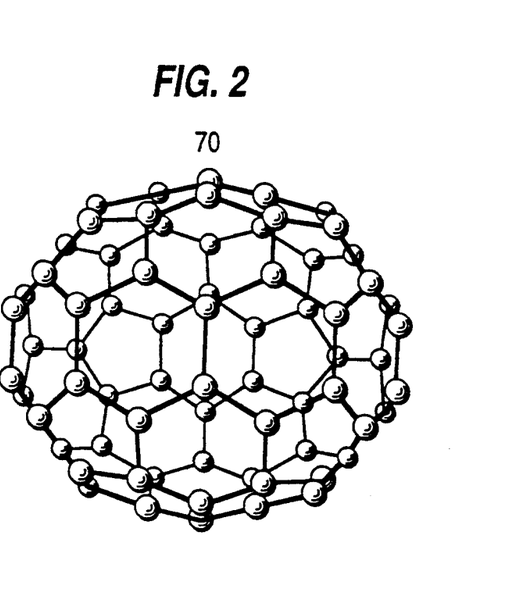
FIG. 2 is a diagram showing a $C_{70}$ fullerene.
Figure 3:
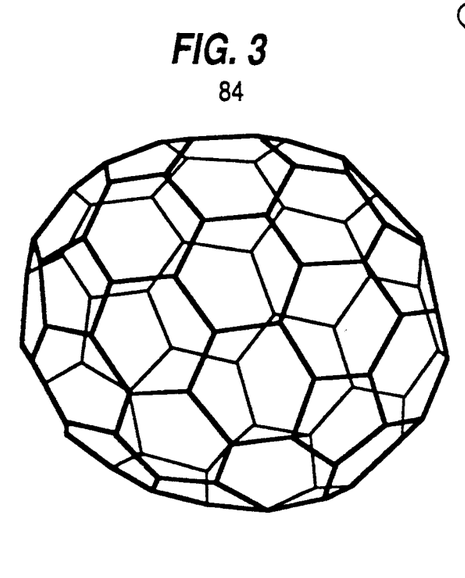
FIG. 3 is a diagram showing a $C_{84}$ fullerene.

A fullerene structure is characterized in that each carbon atom is bonded to three other carbon atoms. The carbon atoms so joined curve around to form a molecule with a cage-like structure and aromatic properties. A fullerene molecule with 60 carbon atoms, referred to as "buckminsterfullerene," resembles the familiar shape of a soccer ball. A structural diagram representing $C_{60}$ is shown in FIG. 1. Fullerenes may contain even numbers of carbon atoms totalling from 20 to 500 or more. FIG. 2 shows the structure of a $C_{70}$ fullerene and FIG. 3 shows the structure of a $C_{84}$ fullerene. Fullerenes are not necessarily spherical. They may take the form of long tubular structures with hemispherical caps at each end of the tube. Hyperfullerene structures also exist wherein one structure is contained within a second larger structure. For generally spherical molecular structures, these hyperfullerenes resemble an onion layered structure. Tubular structures within larger structures are also possible. Fullerenes are more fully described in the literature cited above.

II. Description of the Prior Art

The molecular structure for buckminsterfullerene was first identified in 1985, see NATURE, $C_{60}$. "Buckminsterfullerene", Kroto, H. W., Heath, J. R., O'Brien, S. C., Curl, R. F. and Smalley, R. E., Vol. 318, No. 6042, pp. 162-163, Nov. 14, 1985. The process described therein for making fullerenes involves vaporizing the carbon from a rotating solid disk of graphite into a high-density helium flow using a focused pulsed laser. That process did not utilize a temperature controlled zone for the growth and annealing of fullerene molecules from the carbon vapor formed by the laser blast. Only microscopic quantities of fullerenes were produced by this process.

Another method of making fullerenes was described in THE JOURNAL OF PHYSICAL CHEMISTRY, "Characterization of the Soluble All-Carbon Molecules $C_{60}$ and $C_{70}$," Ajie et. al, Vol. 94, Nov. 24, 1990, pp. 8630-8633. The fullerenes are described as being formed when a carbon rod is evaporated by resistive heating under a partial helium atmosphere. The resistive heating of the carbon rod is said to cause the rod to emit a faint gray-white plume. Soot-like material comprising fullerenes is said to collect on glass shields that surround the carbon rod.

Another method of forming fullerenes in greater amounts is disclosed in U.S. Pat. No. 5,227,038 filed Oct. 4, 1991 wherein carbon is vaporized in an electrical arc and the carbon vapor condenses into fullerenes. U.S. Pat. No. 5,227,038 is incorporated herein by reference.

One disadvantage of the prior art is the low yield of fullerenes containing metal atoms. Another disadvantage of the prior art is the inability to produce fullerenes containing two or more metal atoms inside the fullerene cage. These and other disadvantages of the prior art are overcome by the present invention which provides a method of producing fullerenes in macroscopic quantities, some containing metal atoms inside the fullerene cage. Atoms of elements other than carbon may also be incorporated in the fullerene cage network. The present invention also provides a composition comprising fullerenes with two or more metal atoms inside the fullerene cage and a method for making such a composition.

SUMMARY OF THE INVENTION

This invention provides a process for making fullerene compounds by heating carbon materials using a focused laser beam to form a carbon vapor, and then providing a temperature controlled space for the carbon atoms in the carbon vapor to combine in a fullerene structure. Atoms of metallic elements may be contacted with the carbon vapor to yield fullerenes wherein the carbon network encloses one or more of the metal atoms. The fullerene molecules, along with graphite carbon molecules, are then condensed and collected as solid soot material. The fullerenes may be purified by extracting the soot with an appropriate solvent followed by evaporation of the solvent to yield the solid fullerene molecules.

These fullerene compounds may be useful as molecular carriers for drugs or catalysts. Doped fullerenes may be useful as p-type or n-type dopants in fullerene semiconductor devices. Metal containing fullerenes may be useful as catalysts. Many other uses for these fullerenes are possible.

One feature of this invention is the laser vaporization of a carbon source to form a carbon vapor which is then retained in a temperature controlled space to provide for the growth and annealing of fullerene molecules. Another feature of this invention is the laser vaporization of a carbon source followed by contacting the carbon vapor with metal atoms to form fullerenes with at least one metal atom inside. A third feature of this invention is the laser vaporization of a carbon source containing metal atoms to form fullerenes with one, two or more metal atoms inside the fullerene cage. A fourth feature of this invention is the laser vaporization of a carbon source containing atoms of elements other than carbon to form fullerenes wherein one or more of the atoms of the fullerene cage is an atom of an element other than carbon. These and other features of this invention will become apparent from the following detailed description, wherein reference is made to the figures in the accompanying drawings.

DETAILED DESCRIPTION OF THE INVENTION

In this application, accepted symbols for elements and subscripts to denote numbers of elements will be utilized to describe molecules. In addition, a set of parentheses around the symbol "@", will be used to indicate that the atoms listed within the parentheses are grouped to form a fullerene. Within the parenthetical group, all atoms listed to the right of the @ symbol are part of the fullerene cage network, and all atoms to the left of the @ symbol are situated inside the cage. Under this notation, buckminsterfullerene is (@ $C_{60}$), and a $C_{60}$-caged metal species is written (M@$C_{60}$). A more complex example that will be encountered below is $K_2(K@C_{59}B)$, which denotes a 60-atom fullerene cage with one boron atom substituted for a carbon in the fullerene cage network, a single potassium atom trapped inside the fullerene cage, and two potassium atoms adhering to the outside.

The invention, in one aspect, provides a method for making fullerene molecules by a laser vaporization process wherein the carbon vapor produced is maintained at a controlled temperature for a sufficient amount of time to dramatically increase the fullerene yield over what has been obtained by the prior art. A carbon vapor may be provided by vaporizing any source of carbon. Diamond, graphite, fullerene or combinations thereof may serve as the carbon source. Graphite is cheaper and is therefore preferred.

The carbon must be heated to a temperature sufficient to form a carbon vapor. The energy necessary to heat carbon to a vapor may be provided by a focused laser beam. Any type of pulsed laser which produces a beam that will vaporize carbon will work. The energy fluence of the beam should be greater than $10^{-4}$ joule/mm$^2$ with each pulse lasting between 1 and 100 nanoseconds. One type of laser which works well is a Nd:YAG (Neodymium doped Yttrium Aluminum, Garnet) laser made by Quantel. The green, second harmonic of the Nd:YAG laser may be used and the laser operated at 300 millijoule (mJ) per pulse, each pulse having a duration of 5 to 10 ns. The laser is operated at 10 pulses per second (pps). Other types of lasers will work, including an Eximer XeCl laser with a wavelength of 308 nm which may be more economical in the production of fullerenes.

The laser beam should be aimed at a carbon source so that the energy from the laser will vaporize the carbon. The carbon source may be in the form of carbon rods made as disclosed in Ser. No. 07/771,741. Since the rods need not be electrically conductive, rods prepared by omitting the graphitization step will also be useful in this invention. Carbon may also be in the form of flat discs formed from carbon or a flat disc with a film of carbon deposited on the surface. Any type of carbon source may serve as the laser target including graphite dust, graphite molded into any shape, diamond, diamond dust and fullerenes. Graphite rods are relatively inexpensive and easy to work with and are therefore preferred.

The carbon source may be pure carbon to result in unsubstituted fullerene formation after vaporization. Alternatively, the carbon source may contain other materials selected to form a desired type of substituted or "doped" fullerene after vaporization. For instance, the carbon source may contain boron nitride (BN) in addition to carbon. Upon vaporization, some of the boron atoms will be incorporated in the fullerene cage network. A carbon source containing BN has been vaporized to produce such compounds as (@$C_{55}B$), (@$C_{58}B_2$), (@$C_{57}B_3$), (@$C_{55}B_5$) and (@$C_{54}B_6$). Any number of different boron substituted fullerenes may be formed in this manner and may be generally represented by the formula (@$C_xB_y$) where x is an integer, x+y is an even number from 40 to 1000 or more, and x/y is equal to or greater than 10. Other sources of boron may be used such as pure boron powder, boron hexafluoride ($BF_6$) and sodium borate ($Na_2B_4O_7$). Further information about the preparation and analysis of boron doped fullerenes may be found in "Doping Bucky: Formation and Properties of Boron-Doped Buckminsterfullerene," Guo, Ting; Changming, Jin; and Smalley, R. E., The Journal of Physical Chemistry, Vol. 95, No. 13, pp. 4948–4950, (1991), which is incorporated herein by reference.

Atoms of nitrogen may be incorporated into the fullerene cage by combining potassium cyanide (KCN) with carbon in the carbon source material and vaporizing the KCN concurrently with the carbon by the laser. Other sources of nitrogen may be used, for example polyacrylamide.

In addition to forming fullerenes wherein one or more of the positions in the fullerene cage has been substituted with an atom of an element other than carbon, it is also possible to form fullerenes with at least one atom inside the fullerene cage. Atoms of metallic elements in Groups IA, IIA and IIIB including the lanthanide and actinides may be trapped inside a fullerene structure. Group IA metals include lithium, sodium, potassium, rubidium, cesium and francium. Group IIA metals include beryllium, magnesium, calcium, strontium, barium, and radium. Group IIIB metals include scandium, yttrium, lanthanum, and actinium and include the lanthanide and actinide series of elements. Specifically preferred in this group are atoms of lanthanum (La), yttrium (Y), potassium (K) and europium (Eu).

The metallic atoms may be combined with carbon in the carbon source. The metallic atoms may be in the form of pure metals or preferably as metal halides or metal oxides. The amount of metallic compound combined with carbon will vary depending on the metallic compound and the desired end product, but generally the carbon source may contain 0.1 to 40 wt % of the metallic compound, preferably 1 to 20 wt % and more preferably 2 to 10 wt %. For instance $La_2O_3$, $Y_2O_3$, $Eu_2O_3$ may be combined with the carbon in the carbon source which on vaporization will result in a carbon vapor which also contains atoms of metals. Some of the fullerene molecules will then grow and close around one or more of the metal atoms. $La_2O_3$ has been combined with carbon in this manner and vaporized to form (La@$C_{60}$), (La@$C_{74}$) and (La@$C_{82}$). (La@$C_{82}$) is particularly abundant in the recovered products.

The fullerene structure may enclose one or more than one metallic atom. For example, two, three, or four or more metal atoms may be enclosed by the fullerene structure, including compounds represented by the formula ($M_z$@$C_x$) where M is an atom of an element from Groups IA, IIA or IIIB of the Periodic Table of the Elements including the lanthanides and actinides, z is an integer from 1 to 100, and x is an even number greater than or equal to 36. Preferably x is 40 to 160, more preferably 50 to 80. Representative compounds formed by this process include ($La_2$@$C_{66}$), ($La_2$@$C_{80}$), ($La_2@C_{106}$), ($La_3@C_{88}$), ($La_3@C_{102}$), ($La_3@C_{94}$), and ($La_4@C_{124}$). Lanthanum atoms have been formed in fullerenes of various sizes including ($La_2@C_{x''}$) wherein $x''$ is an even number from 66 to 138, ($La_3@C_{x'''}$) wherein $x'''$ is an even number from 88 to 126, and ($La_4@C_{x''''}$) wherein $x''''$ is an even number from 110 to 124. When $Y_2O_3$ is combined with graphite and vaporized, macroscopic amounts of ($Y_2@C_{82}$) are formed.

Molecules with atoms other than carbon as part of the fullerene cage network may also be formed enclosing one or more metal atoms. This may be accomplished by including the metallic compound and the compound other than carbon together in the carbon source material. For instance, a carbon rod could be formed from carbon, $La_2O_3$ and BN. Alternatively, the carbon rod could be formed from carbon potassium chloride and boron powder.

Another way of forming the molecules is to incorporate boron powder with carbon in the rod, vaporize the boron and carbon, and then contact the hot vapor with potassium chloride. Contact with KCl may be accomplished by injecting KCl into the hot vapor stream or by coating the inside of the vapor conduit downstream from the vaporization zone.

Molecules such as ($K@C_{60}$), ($K@C_{59}B$), and ($K@C_{58}B_2$) have been produced by vaporizing a carbon source containing boron in the presence of potassium. Molecules with the general formula ($M_a@C_xB_y$) wherein M represents an atom of an element selected from Groups IA, IIA and IIIB of the Periodic Table of Elements including lanthanides and actinides, a is an integer from 1 to 100, x is an integer, $x+y$ is an even number from 40 to 1000, and $x/y$ is equal to or greater than 10. Preferably $x+y$ is from 40 to 160, more preferably 50 to 80. Specific compositions, in addition to those described above, in accordance with this formula include ($K@C_{57}B_3$), ($K@C_{56}B_4$), ($K@C_{55}B_5$), ($La@C_{59}B$), ($La@C_{58}B_2$), ($La@C_{57}B_3$), ($La@C_{56}B_4$), ($La@C_{55}B_5$), ($La@C_{81}B$), ($La@C_{80}B_2$), ($La@C_{79}B_3$), ($La@C_{78}B_4$), ($La@C_{77}B_5$), ($La_2@C_{105}B$), ($La_2@C_{104}B_2$), ($La_2@C_{103}B_3$), ($La_2@C_{102}B_4$), ($La_3@C_{93}B$), ($La_3@C_{92}B_2$), ($La_4@C_{123}B$), ($La_4@C_{122}B_2$) and ($La_4@C_{121}B_3$). Many other combinations are possible.

As described above, the carbon source may comprise carbon in forms including graphite and fullerenes. One way of making the source material is by generating it in the electrical arc process described in U.S. Ser. No. 07/771,741. The soot produced by the arc process may then be shaped into a target carbon source for the laser beam.

Laser vaporization of carbon should occur in an, atmosphere selected to promote, or at least not hinder, the formation of fullerenes. The atmosphere necessary for forming pure carbon fullerene molecules from a carbon vapor includes inert gases such as helium, neon, argon, krypton, and xenon. Other gases may be useful in providing an inert atmosphere as long as the molecules of the atmosphere are not reactive with the carbon vapor. Other possibilities for the atmosphere include carbon monoxide, carbon dioxide and nitrogen. Hydrogen containing gases such as water vapor should not be used as they are believed detrimental to fullerene formation. Currently, a helium atmosphere is preferred.

The carbon vapor is preferably formed in an inert gas at a low pressure ranging from 1 to 20,000 Torr, and preferably 5 to 2000 Torr. Absolute pressures of helium ranging from 10 to 700, preferably 50 to 500 Torr have been found to be particularly useful for generating a carbon vapor from which fullerenes may be condensed.

Due to the limited atmospheres and pressures within which fullerenes can be collected in sufficient quantities, the process is usually carried out inside a fully enclosed chamber or system. The enclosed chamber or system may be evacuated by means of a vacuum pump thereby removing undesirable hydrogen-containing molecules such as water. After the chamber or system has been evacuated, it may be partially refilled with the desired atmosphere such as helium.

Although a high temperature is necessary to vaporize carbon, the resulting carbon vapor should not reside at this temperature for very long periods; however, it is also desirable to avoid cooling the carbon vapor too fast. Preferably, the carbon vapor is maintained at a temperature above 1,000° C. for at least 0.1 millisecond after the vapor is formed. It is therefore desirable to move the carbon vapor from the immediate vaporization zone to a zone of controlled temperature that will allow the carbon vapor to grow into a network that will eventually form a fullerene molecule. Thereafter, the gas stream which will contain carbon vapor, fullerenes, and graphitic carbon should be moved to a cooler zone to condense solid fullerene molecules along with solid graphite soot. Suitable conditions for the fullerene growth and formation include residence times of 0.1 millisecond (ms) to 100 seconds (s), 0.5 ms to 50 s, or 1 ms to 10 s, at temperatures of 1,000° C., preferably 1,100° C. to 1,500° C. and more preferably 1,100° C. to 1,300° C.

The temperature may be controlled within these limits by means well known in the art. For instance, the temperature and flow rate of the inert gas may be adjusted so that the fullerene growth and formation zone is in thermodynamic equilibrium at the desired temperature. Alternatively, an external heater may be provided to keep the fullerene growth and formation zone at the desired temperature.

Condensation of fullerene molecules and graphite soot may be obtained by moving the carbon vapor away from the temperature controlled fullerene growth and formation zone and cooling off the passageway through which it is moving. Temperatures below 2000°, preferably below 1000° C. will condense the fullerenes and graphite soot. Cooling and condensation may also be controlled by adjusting the flow velocity and temperature of any inert gas flow of the process which is more fully described below.

In order to facilitate removal of the carbon vapor from the laser vaporization zone and passage of the carbon vapor into the temperature controlled fullerene growth and formation zone, a gas flow may be provided. The gas may be directed across the laser vaporization zone and into the temperature controlled fullerene growth and formation zone. The gas may then be withdrawn from the condensing area by means of a pump or fan. If inert gas is withdrawn from the system, fresh inert gas should be introduced at about the same rate as gas is withdrawn.

Preferably the gas is recirculated in order to conserve the inert gas. The recirculation may be effected by providing a gas circulating turbine which circulates the inert gas around from the vaporization chamber exit back to the chamber gas inlet, across the vaporization zone, through the fullerene growth and formation zone, the condensing zone, and back out the chamber exit. Preferably a filter or other separating means is provided to remove any graphite soot and fullerene molecules that may remain in the gas stream after condensation before the gas stream is reintroduced to the vaporization zone. Any means of separating solid particles from a gas may be utilized, for instance cyclone separators may be used instead of or in addition to filtration. Fullerenes and any graphite soot may also be removed from the gas stream by means of a rotating cooled cylinder or drum located in the gas stream. The cooled rotating cylinder would condense fullerenes on its surface exposed to the carbon vapor stream. Condensed fullerenes could then be scraped or brushed off of the cylinder and recovered.

It may be advisable to add some kind of protecting agent either before or during condensation or purification of fullerenes containing one or more metal atoms inside or boron doped fullerenes. Undoped fullerenes may serve as adequate protecting agents for fullerenes with metals inside. Other protecting agents for fullerenes with metals inside may be useful including boron trifluoride ($BF_3$). Fullerenes doped with boron are electron deficient at the boron site and may be protected with electron donating compounds such as ammonia, amines, and pyridines.

Recovery of fullerene compounds from the carbon soot may be accomplished by extracting the carbon soot with an extraction solvent which preferentially dissolves fullerene compounds but not graphite. The extract may then be filtered to remove the solid graphite leaving a filtrate containing the solvent and fullerenes. Evaporation of the solvent from the extract will allow recovery of fullerenes as the solid residue. Separation of fullerene from graphite may be accomplished by other methods known to those skilled in separation arts. For instance, separation may be accomplished by boiling solvents, ultrasonic sonication separation, supercritical fluid extraction, Soxhlet extraction and many other methods known to those skilled in separation arts.

Figure 4:
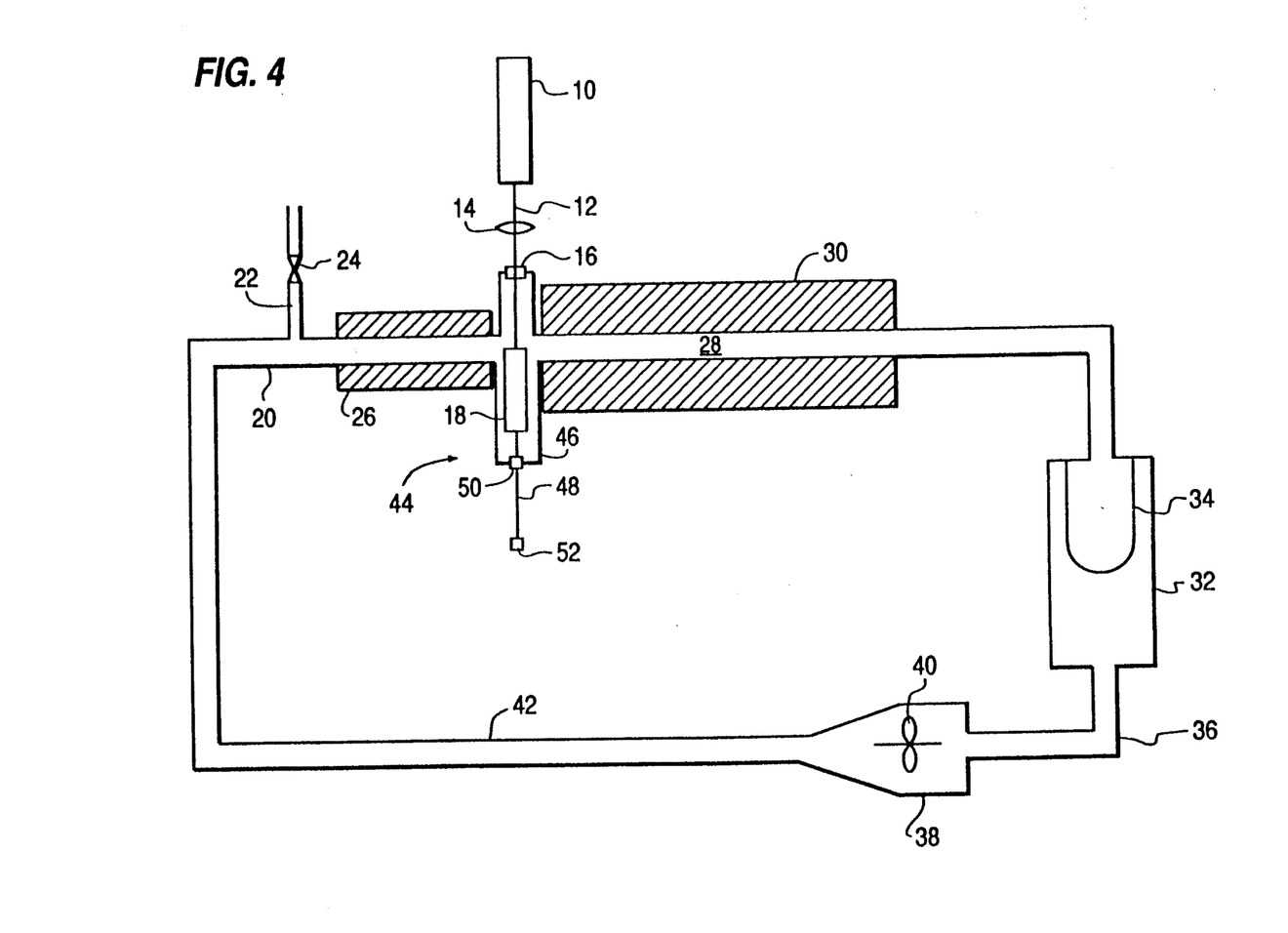
FIG. 4 is a cross-sectional view of a laser vaporization apparatus.

This invention may be better understood by reference to FIG. 4 wherein laser source 10 emits a pulsed laser beam 12. The laser beam 12 passes through lens 14 and through window 16 and hits target 18. The target 18 may be comprised of carbon alone or carbon and one or more of the materials described above including boron, nitrogen, and metals including lanthanum. The materials comprising target 18 are vaporized by laser beam 12 and are carried away from the vaporization area by inert gases flowing in conduit 20. Inert gases may be added to conduit 20 through conduit 22 and the rate of inert gas addition may be controlled by valve 24. It may be desirable to pre-heat the inert gas stream either by pre-heating the inert gas before it enters conduit 20 or by means of a heater 26 surrounding conduit 20 immediately upstream of target 18.

The materials vaporized from target 18 are carried by the inert gas stream into a temperature controlled zone 28. The temperature controlled zone 28 is the part of conduit 20 that is downstream of target 18. For optimum fullerene generation, the temperature of zone 28 should be maintained between 1000° and 1500° C. One means of controlling the temperature in zone 28 is heater 30 through which the immediate downstream portion of conduit 20 passes. Alternatively, the temperature of zone 28 may be maintained within appropriate ranges without the use of heater 30 by maintaining the appropriate temperature and flow rate of the inert gas feed stream. Zone 28 should be large enough to provide for residence times of between $10^{-4}$ and 100 seconds so that fullerenes have an adequate opportunity to grow and form.

Fullerenes may be condensed and collected by cooling down the exit portion of conduit 20 past zone 28. Fullerenes will collect on the cool walls of conduit 20 and may be recovered by brushing the inside walls of conduit 20. The method of recovery shown in FIG. 4 also utilizes a filter assembly 32 into which conduit 20 empties. Filter assembly 32 contains a filter 34 disposed in the gas stream exiting conduit 20 in order to filter out particles of fullerene and graphite soot. The flowing inert gas stream may be removed from the system by conduit 36 exiting from filter assembly 32. Alternatively, the inert gas may be recirculated by gas recirculation assembly 38 containing a fan blade 40 for blowing the filtered inert gas stream through conduit 42 which is connected to the exit of gas recirculation assembly 38. The inert gas then recirculates around through conduit 42 back into conduit 20.

It is preferable to rotate target 18 during the vaporization process to ensure even vaporization of the surface of target 18. One means of accomplishing the rotation is rotation assembly 44 which comprises target housing 46 attached to conduit 20 in a way to keep conduit 20 sealed from the external atmosphere. Rotation of the target 18 may be accomplished by connecting target 18 to axle 48 which passes through target housing 46. Since the apparatus is usually operated below atmospheric pressure, axle 48 passes through target housing 46 through a rotary vacuum feed through 50 which prevents the outside atmosphere from entering target housing 46. Axle 48 terminates at positioning gear 52 which may be mechanically rotated (by means not shown in this Figure) to spin axle 48 along its axis and thereby rotate target 18.

Since the surface of target 18 is eroded at the point of laser beam impact, it is necessary to advance target 18 toward window 16 if the process is to be continuous. This may be accomplished by mechanically advancing positioning gear 52 toward window 16 (by mechanical means not shown) at a rate roughly equal to the rate of decrease of length of target 18.

In operation, target 18 may be a carbon rod prepared as described above mounted with the cross section of the rod face positioned to be hit by laser beam 12. Fresh inert gas may be added to the system through conduit 22 and heated by heater 26 to approximately 1200° C. At the same time, heater 30 should be activated, if needed, so that zone 28 is maintained at a temperature of 1000° to 1500° C. Once the temperatures in zone 28 have stabilized at a desired level, the laser source 10 should be energized so that laser beam 12 is focused on the surface of target 18. The materials which comprise target 18 will be vaporized by laser beam 12 and carried away by the gas stream flowing in conduit 20 through zone 28. While in zone 28, the materials vaporized from target 18 will grow and form into fullerene molecules. If atoms besides carbon are present in the vapor, some of the atoms will be incorporated inside a fullerene cage containing only carbon atoms, some of the atoms will be incorporated inside a fullerene cage containing mostly carbon atoms but also other kinds of atoms, and some fullerenes will be formed with nothing inside the cage but with atoms other than carbon forming parts of the fullerene cage. All these molecules will condense and be collected on the down stream end of conduit 20 past zone 28. Molecules which condense but do not adhere to the walls of conduit 20 will be collected in filter 34.

The materials formed by the process may be collected and purified by any of the methods described above.

Figure 5:
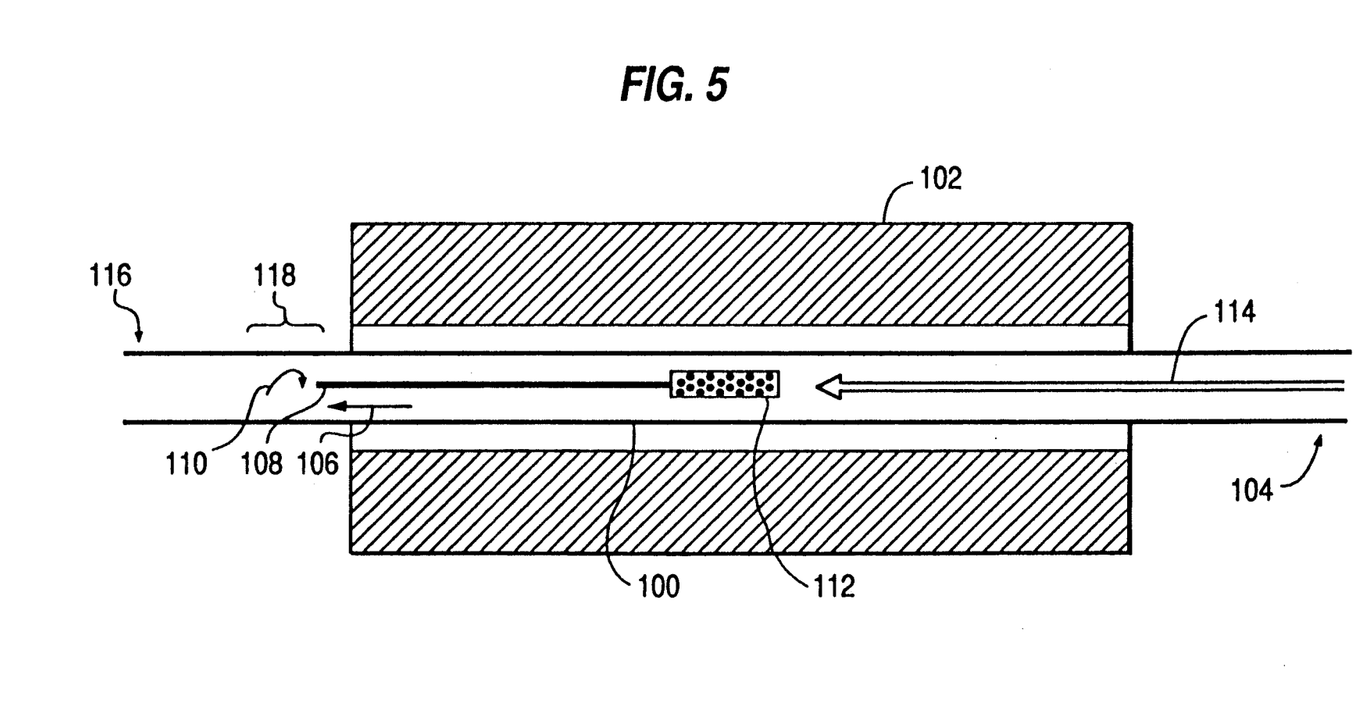
FIG. 5 is a diagram of a laser vaporization apparatus.

The invention can also be understood with reference to FIG. 5 which depicts a simple version of an apparatus suitable for forming the fullerenes described herein. A quartz tube 100 may be mounted in furnace 102. The furnace 102 is maintained at a temperature of 1,000° to 1,500° C. An inert gas may be introduced into the end 104 of tube 100 so that the inert gas flows in the direction indicated by arrow 106.

An axle 108 may be mounted within quartz tube 100. The axle 108 should be mounted so that it may be rotated within the tube in a clockwise or counterclock motion as indicated by arrow 110. (The means for mounting and rotating axle 108 are not shown in the figure.) A target 112 is mounted on the end of axle 108 so that target 112 is held within a fixed position within tube 100 and target 112 may be rotated by the rotation of axle 108. In the embodiment shown in FIG. 5, target 112 is located within furnace 102. However, target 112 may be mounted closer to end 104 of tube 100 and target 112 may even be outside of furnace 102.

In operation, axle 108 is rotated and a laser source is activated to send a pulse of a laser beam 114 down the central portion of tube 100 so that laser beam 114 impacts upon target 112. The energy from laser beam 114 will then vaporize the material contained in target 112 and the cloud of vaporized material will be carried by the inert gas toward end 116 of tube 100. A fullerene containing soot will collect on the walls of tube 100 at area 118. Further collection and purification of fullerene molecules may be accomplished as described above.

A film comprising fullerenes and metal containing and/or boron doped fullerenes may be made by subliming the material produced in the vaporization process onto a crystalline surface. Such a film may be used as a semiconductor device in the same manner as semiconductor lattices like silicon.

EXAMPLE 1

The laser vaporization fullerene generator used in this work was a 2.5 cm diameter, 50 cm long quartz tube mounted in a temperature-controlled tube furnace (Lindberg Model 550035). The tube was 0-ring sealed on the front end to an aluminum block. The aluminum block contained a fused silica window and conduits for adding gas and monitoring temperature and pressure. A second aluminum block was attached at the rear of the quartz tube and connected by an adjustable valve to a mechanical vacuum pump. A rotary vacuum feed-through Huntington (Model VF-106) mounted at the end of the second aluminum block is attached inside the quartz tube to one end of a 6 mm o.d. graphite rod that extends through a graphite centering ring into the heated portion of the tube furnace. The other end of the 6 mm o.d. graphite rod was threaded into the rear of a 1.25 cm diameter graphite sample rod of the desired composition to serve as the target for the vaporization laser. During vaporization, the target rod was rotated at 2 rpm in order to maintain a uniform, reproducible surface to the incoming laser beam.

For this experiment, the vaporization laser was the green second harmonic of a Nd:YAG laser operating at 300 nJ/pulse at 10 pps. The roughly 10-mm diameter nearly Gaussian output beam of this laser was concentrated on the cross-sectional surface at the end of the target carbon rod in the laser vaporization apparatus using a 50 cm focal length cylindrical lens positioned 60 cm away from the end of the rod, producing an oval vaporization region 1.0 cm high and 0.2 cm wide.

An atmosphere of Argon was used at a pressure of 250 Torr for the vaporization experiments described herein. With pure graphite targets, this resulted in toluene-soluble fullerene yields of well over 10% of the vaporized carbon.

To produce trapped metal fullerenes, composite graphite target rods were made by mixing lanthana powder, $La_2O_3$ (Aesar AAS Grade 99.99%), with graphite powder (Ultra Carbon graphite powder, ultra F purity) together with graphite cement (Dylon Industries, GC grade) and pressing into a 1.25 cm cylindrical die while curing the cement at 100° C. The resulting rod was than carbonized by slowly heating in argon at a rate of 1° C./min up to a temperature of 400° C., and then heating it at a rate of 5° C./min to 1200° C. and then baking at 1200° C. for ten hours. In some of the experiments, $LaB_6$ was used in place of the $La_2O_3$. In others KCl and/or boron powder was added. Fullerene samples were collected and analyzed as described in "Fullerenes With Metals Inside," Chai, et al., *Journal of Physical Chemistry*, Vol. 95, No. 20, pp. 7564–7568 (1991), which is incorporated herein by reference.

Laser vaporization of a 7% (by weight) $La_2O_3$ in a graphite target rod in the tube furnace produced a black-brown deposit on the cool downstream end of the quartz tube. Analysis of the product showed that it contained $(@C_{60})$, $(@C_{70})$, $(La@C_{60})$, $(@C_{74})$, $(La@C_{74})$, and $(La@C_{82})$.

EXAMPLE 2

Using the same laser vaporization apparatus described for Example 1, a $La_2O_3$/graphite composite sample was repeatedly struck with vaporization laser pulses of greater than 10 mJ. After multiple strikes by the laser beam, greater amounts of fullerenes containing two or three atoms of lanthanum inside were formed. This method of striking the target a multiple number of times with the laser beam has proven very effective for forming fullerenes with more than one metal atom inside.

Although the number of strikes of the laser beam that is optimum is not known, at least two strikes by the laser beam, preferably at least five strikes by the laser beam at the same spot on the target is beneficial in forming greater amounts of fullerenes with more than one metal atom inside.

EXAMPLE 3

Boron doped fullerenes containing potassium inside were formed in the laser vaporization apparatus described in Example 1. To produce this material, boron and carbon were combined to form the target. Potassium chloride was coated on the inside of the quartz tube so that the vapor of carbon and boron contacted the potassium chloride inside the quartz tube. Laser vaporization of the carbon boron target in the presence of potassium chloride produced $(@C_{59}B)$, $(K@C_{60})$, $(K@C_{59}B)$, $(K@C_{58}B_2)$, $K(K@C_{60})$ and $K_2(K@C_{60})$.

The description and examples above illustrate aspects of the invention and are not limitations on the scope of the invention which is set forth in the following claims. Many other variations and modifications may be made to the process described without departing from the concept of the present invention.

That which is claimed is:

1. A process for making fullerenes comprising:
   (a) providing a carbon source comprising carbon to a carbon vaporization zone,
   (b) passing an inert gas stream through the carbon vaporization zone,
   (c) vaporizing carbon from the carbon source with a laser beam to produce a carbon vapor that is carried away from the carbon vaporization zone by the inert gas stream,
   (d) passing the inert gas stream and carbon vapor through a fullerene growth and formation zone wherein the temperature is between 1,000° and 2,000° C. and the residence time of the carbon vapor in the fullerene growth and formation zone ranges from 0.1 millisecond to 100 seconds, and
   (e) withdrawing fullerenes from the fullerene growth and formation zone.

2. A process in accordance with claim 1 wherein the absolute pressure of the inert gas in the carbon vaporization zone ranges from 10 to 700 Torr, and the residence time of the carbon vapor in the fullerene growth and formation zone is between 0.5 ms to 50 s.

* * * * *